(12) United States Patent
Anderson et al.

(10) Patent No.: US 6,796,531 B1
(45) Date of Patent: Sep. 28, 2004

(54) CANOPY RELEASE LOCKING BAR

(75) Inventors: Wade Anderson, Corona, CA (US); Charles Van Druff, Laguna Hills, CA (US); Douglas G. Scheid, Orange, CA (US); Joseph M. Byrne, Yorba Linda, CA (US)

(73) Assignee: H. Koch & Sons Co., Inc., Anaheim, CA (US)

( * ) Notice: Subject to any disclaimer, the term of this patent is extended or adjusted under 35 U.S.C. 154(b) by 0 days.

(21) Appl. No.: 10/665,038

(22) Filed: Sep. 15, 2003

(51) Int. Cl.[7] .............................................. B64D 17/00
(52) U.S. Cl. ............................. 244/151 R; 244/151 B
(58) Field of Search ..................... 244/151 R, 151 A, 244/151 B; 24/643–645, 648, 654

(56) References Cited

U.S. PATENT DOCUMENTS

| | | | | |
|---|---|---|---|---|
| 2,834,083 A | * | 5/1958 | Newell et al. ................ | 24/323 |
| 2,868,580 A | * | 1/1959 | Stevens et al. ............ | 294/82.3 |
| 3,237,265 A | * | 3/1966 | Ralph .......................... | 24/602 |
| 3,306,653 A | * | 2/1967 | Gaylord ................... | 294/82.25 |
| 3,426,985 A | * | 2/1969 | Pravaz .................... | 244/151 A |
| 3,922,762 A | * | 12/1975 | Turner et al. ................. | 24/603 |
| 3,942,227 A | * | 3/1976 | Phillips et al. ................ | 24/644 |
| 3,964,138 A | * | 6/1976 | Gaylord ....................... | 24/645 |
| 4,185,363 A | * | 1/1980 | David .......................... | 24/645 |
| 4,203,181 A | * | 5/1980 | Gaylord et al. ............... | 24/645 |
| 4,253,628 A | * | 3/1981 | Marek .................... | 244/151 A |
| 4,365,776 A | * | 12/1982 | Gaylord et al. ......... | 244/151 A |
| 4,684,083 A | * | 8/1987 | Maziarz ................. | 244/151 A |
| 5,097,572 A | * | 3/1992 | Warrick ....................... | 24/645 |
| 5,857,247 A | * | 1/1999 | Warrick et al. .............. | 24/603 |
| 6,249,937 B1 | * | 6/2001 | Grenga ........................ | 24/602 |
| 6,644,597 B1 | * | 11/2003 | Bahniuk ................ | 244/151 B |

\* cited by examiner

*Primary Examiner*—Michael J. Carone
*Assistant Examiner*—Stephen Holzen
(74) *Attorney, Agent, or Firm*—Edgar W. Averill, Jr.

(57) ABSTRACT

A parachute canopy release mechanism. The canopy release releasably holds a strap holding member. The strap holding member is released by movement of a latch, which in turn is released by an actuating lever which is protected against inadvertent opening by a cover. The cover has a cover lock which further prevents the inadvertent release of the latch. The release mechanism can have a removable triggering unit which is activated when the mechanism is exposed to water.

8 Claims, 4 Drawing Sheets

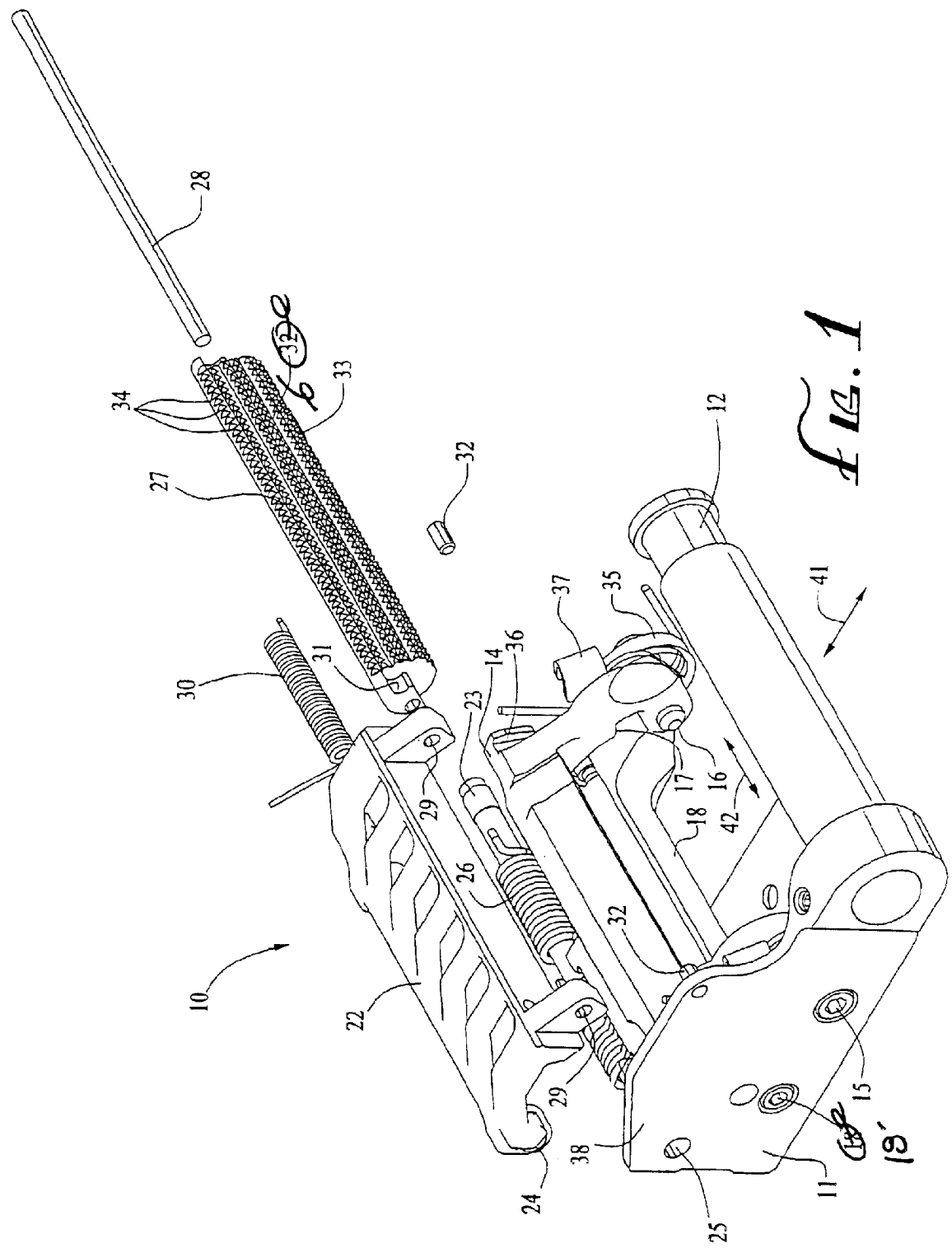

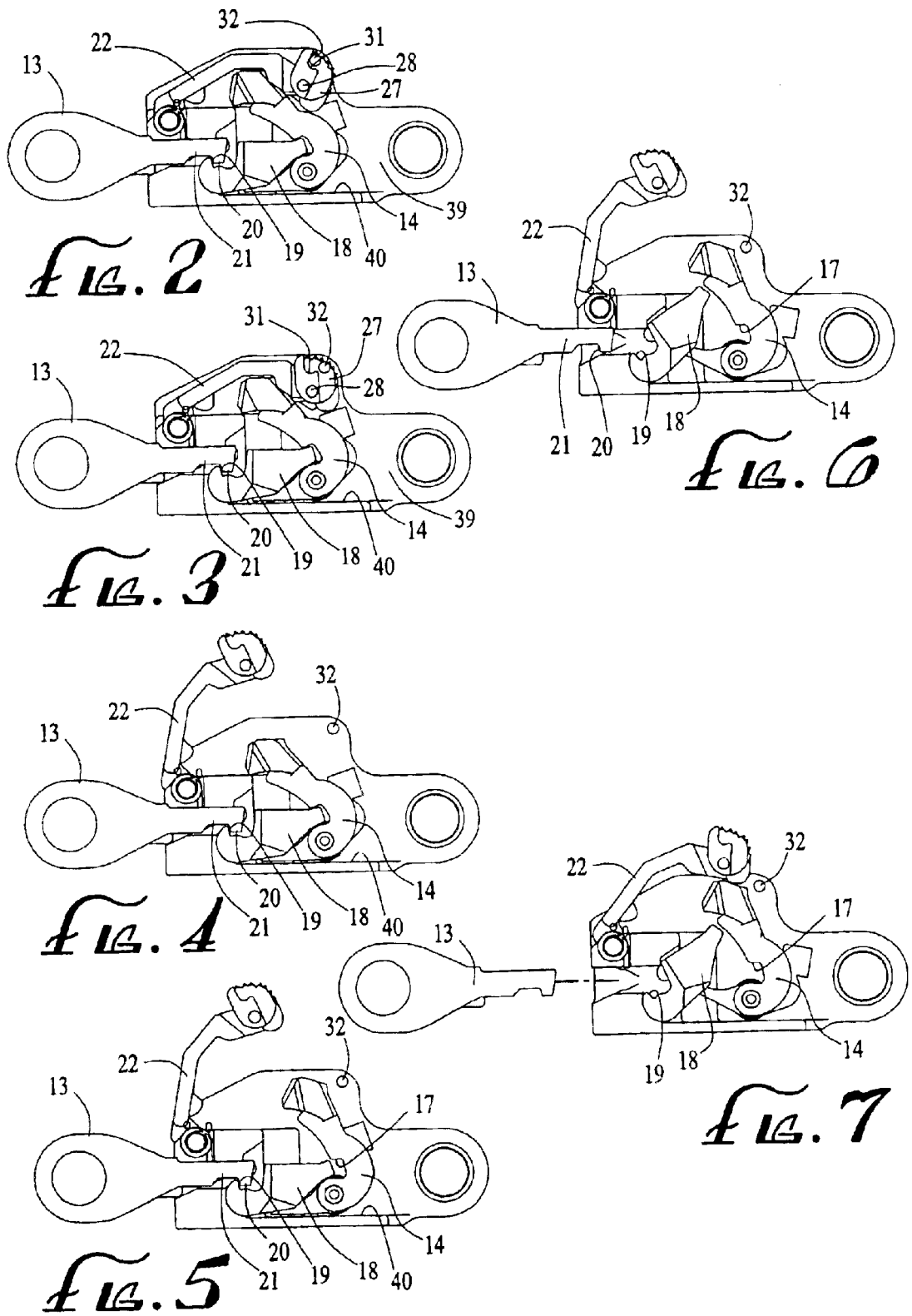

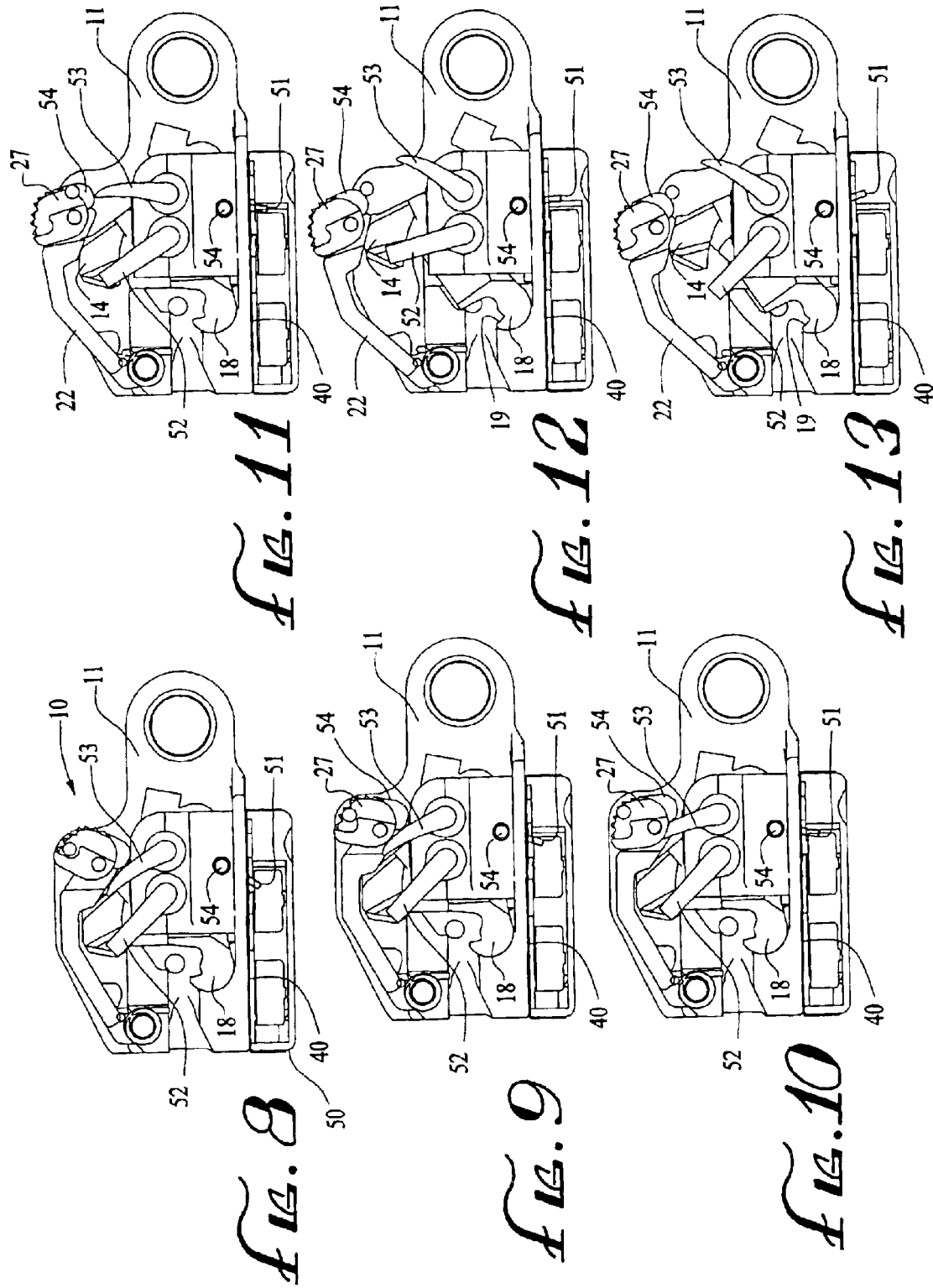

CANOPY RELEASE LOCKING BAR

BACKGROUND OF THE INVENTION

The field of the invention is canopy release mechanisms and the invention related more particularly to the release of harnesses of the type used by the crew of an aircraft.

U.S. Pat. No. 5,857,247 assigned to the assignee of the present application discloses a buckle system having many features of the mechanism of the present invention. This patent is incorporated herein by reference for background purposes.

There is a need for canopy release mechanisms which require less strength-to open. The release mechanism shown in U.S. Pat. No. 5,857,247 meets this requirement. It is essential, of course, that such easier opening mechanisms remain closed until the wearer actively releases the same.

BRIEF SUMMARY OF THE INVENTION

The present invention is a locking bar of a parachute canopy release to keep the cover of the release mechanism closed down over the actuating lever until disconnect is desired. The locking bar prevents the cover of the canopy release from inadvertently opening when subjected to an angular acceleration about the webbing pin. When the canopy release is subjected to an angular acceleration of sufficient magnitude, the cover will begin to rotate outwardly from the actuation lever. The locking bar will rotate in the opposite direction and more fully engage the locking pins, preventing the cover from rising. When the locking bar is manually moved to an open position, the movable cover may be opened, exposing the actuating lever, thereby permitting the release mechanism to release the harness. Knurling is added to the leading edge of the locking bar to assist pilots and crew members to open the release while wearing gloves or while suffering an injury sustained before or during descent on the parachute. Preferably, an automatic release mechanism is included which activates the canopy release when immersed in water. The electronic portion of the water activating system is preferably removably held to the bottom of the frame of the release mechanism.

BRIEF DESCRIPTION OF THE SEVERAL VIEWS OF THE DRAWING

FIG. 1 is an exploded perspective view of the parachute canopy release mechanism of the present invention.

FIG. 2 is a cross-sectional side view of the parachute canopy release mechanism of the present invention showing the locking bar in a locked position.

FIG. 3 is a cross-sectional view thereof showing the locking bar in a release position.

FIG. 4 is a cross-sectional view showing the cover in an opened position.

FIG. 5 is a cross-sectional side view showing the activating lever in an opened position.

FIG. 6 is a cross-sectional side view showing the latch mechanism in an opened position.

FIG. 7 is a cross-sectional view showing the released strap holding member and the cover moved downwardly into contact with the actuating lever.

FIG. 8 is a cross-sectional side view of the parachute canopy release mechanism of FIG. 1 showing the water activated release mechanism prior to activation.

FIG. 9 is a cross-sectional view of the mechanism of FIG. 8 showing the water activated release mechanism initiating the opening of the locking bar.

FIG. 10 is a cross-sectional view analogous to FIG. 8, except showing the locking bar in a fully unlocked position.

FIG. 11 is a cross-sectional-view analogous to FIG. 1 showing the initiation of the opening of the cover.

FIG. 12 is a cross-sectional view analogous to FIG. 11 and further showing the activation of an arm to open the actuating lever and to release the latch.

FIG. 13 is a cross-sectional view showing the final position of the actuating lever opening latch.

DETAILED DESCRIPTION OF THE INVENTION

Figure 14:
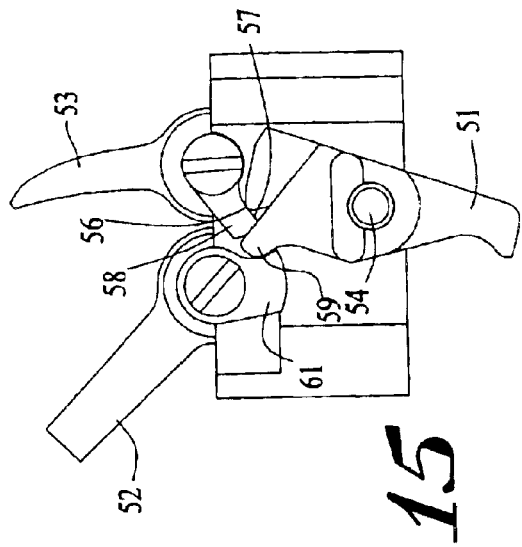
FIG. 14 is a side view of the water actuated opening mechanism of FIGS. 8–13.

The parachute canopy release mechanism of the present invention is shown in exploded perspective view in FIG. 1 and indicated generally by reference character 10. Mechanism 10 has a frame 11, one side 38 of which is shown in FIG. 1. The frame extends under the bottom of the mechanism and has a mirror image part not shown on the other side of the mechanism. The frame permanently supports a harness look securement pin 12. A parachute strap holder 13 is shown in, for instance, FIG. 2 which is released from mechanism 10 when opened.

An actuating lever 14 is held by a pair of hinge pins 15 and 16, held by frame 11. Actuating lever 14 has a pair of latch holding ledges, one of which is shown in FIG. 1 and indicated by reference character 17. Latch holding ledge 17 holds latch 18 in a closed position. The hinge pin for latch 18 is supported by the frame at the location indicated by reference character 18. Latch 18 has a latch tooth 19 shown in FIG. 2. Also as shown in FIG. 2, latch tooth 19 holds a tang tooth 20 of tang 21 of parachute strap holder 13.

Actuating lever 14 is protected by an interlocking cover 22. Interlocking cover 22 has a hinge pin 23 which passes through a pair of openings 24 to pivotally hold interlocking cover 22 in place. Hinge pin 23 is held by a pair of openings 25 in frame 11. A spring 26 urges the cover in a closed position. A closed position for the actuating lever 14 is counter clockwise as viewed in FIG. 1. Actuating lever 14 is urged in a closed position by spring 35 which is held at one end by groove 36 in actuating lever 14 and at the other end by retaining clip 37 which is held by latch 18.

A canopy release locking bar 27 is held by a long pin 28. Long pin 28 is held by a pair of openings 29 in interlocking cover 22. A spring 30 is located over long pin 28 and urges the canopy release locking bar 27 in a locked position. A locked position is clockwise as viewed in FIG. 1.

Canopy release locking bar has a frame engaging member which is a cam 31. Cam 31 engages pins 32 held by frame 11. The locking and unlocking details will be discussed below. Canopy release locking bar 27 preferably has knurling consisting of horizontal grooves 33 and vertical grooves 34. This knurling 33, 34 is positioned on the leading edge of locking bar 27 and assists pilots and crew member to open the release while wearing gloves or suffering an injury sustained before or during descent on the parachute.

Frame 11 has a pair of vertical side plates 38 and 39. Side plate 39 is shown in FIG. 2, as is the floor 40 of frame 11. Frame 11 has a longitudinal axis 41 and a transverse axis 42.

The operation of the canopy release locking bar 27 is shown by viewing FIGS. 2, 3, 4, 5, 6, and 7. In FIG. 2, locking bar 27 pivots about long pin 28 and is in a fully clockwise position. In this position, locking pin 32 holds cam 31 so that the hinged cover 22 cannot be opened. To open cover 22, locking bar 27 is rotated in a counter clockwise direction shown in FIG. 3. In this position, the cam 31 no longer contacts pin 32 and hinged cover is allowed to open as shown in FIG. 4. This exposes actuating lever 14 so that the pilot or crew member can move it in a clockwise direction as shown in FIG. 5. This releases the hold of ledge 17 on latch 18 and permits latch 18 to move in a counter clockwise direction as shown in FIG. 6. Latch 18 is biased to move in a counter clockwise direction by actuating lever spring 35 as shown in FIG. 1. This releases parachute strap holder 13 as shown in FIG. 7. Also, as shown in FIG. 7, the hinged cover 22, as well as locking bar 27, are biased toward a closed position and contact actuating lever 14.

It is useful that this series of opening steps be provided automatically in the event the pilot or crew member is unable to do so after landing in water. Such a mechanism is shown in FIGS. 8, 9, 10, 11, 12, and 13. The important feature of this mechanism is that the water activated release triggering mechanism 50 is removably held over a portion of floor 40. In this way, any improvements in the release triggering units can be simply added by removing the old unit and replacing it with an updated unit. The details of the triggering unit are now shown herein since various mechanisms are known which can cause the movement when immersed in water. The parachute canopy release mechanism 10 has a triggering lever 51 which extends below the bottom of floor 40. The release triggering unit 50 includes means to move triggering lever 51 forward as shown in FIG. 8. Triggering lever 57 is linked to a lever cam 52 and a cover cam 53. The unit is shown in a closed position in FIG. 8.

Once immersed in water, the release triggering unit 50 moves triggering lever 51 forward, which in turn causes cover cam 53 to move in a clockwise direction as shown in FIG. 9. A contact cam 54 is formed on the bottom of canopy release locking bar 27. In this way, the clockwise movement of cover cam 53 causes the counter clockwise movement of locking bar 27.

As shown in FIG. 10, the locking bar 27 has been moved in a fully counter clockwise position and cover cam 53 continues in a clockwise direction shown in FIG. 11, where it lifts cover 22 sufficiently so that actuating lever 14 can be opened. This is accomplished by the clockwise motion of lever cam 52 as shown by comparing FIGS. 10, 11, and 12. When the triggering lever 51 is in its forward most position shown in FIG. 12, the latch tooth 19 has released latch tooth 20 analogous to the position shown in FIG. 7 of the drawings.

Figure 15:
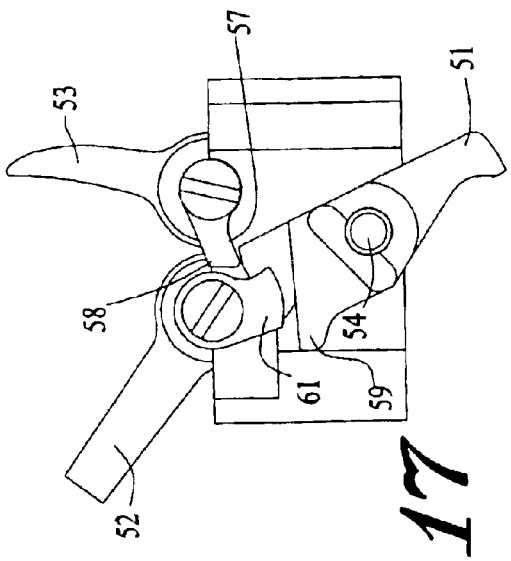
FIG. 15 is analogous to FIG. 14 with the triggering lever rotated partially in a counter clockwise direction.
Figure 16:
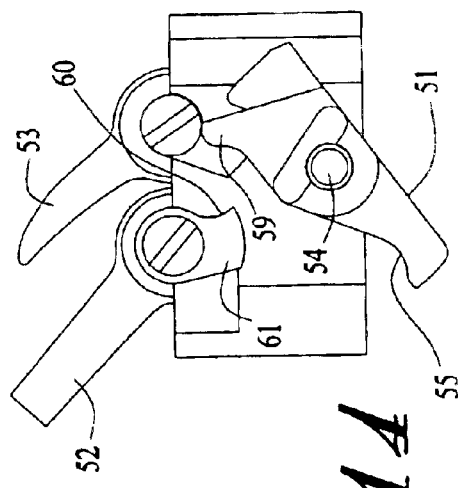
FIG. 16 is a side view analogous to FIG. 15 with the triggering lever in a further counter clockwise position.
Figure 17:
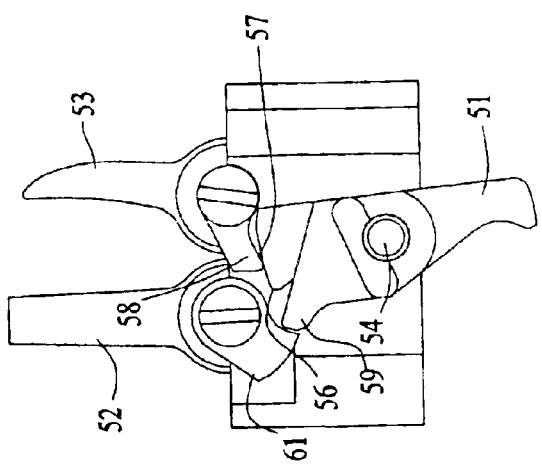
FIG. 17 is a view analogous to FIG. 7 with the triggering lever in a fully counter clockwise position.

The mechanism of the driving of the lever cam and the cover cam are shown in FIGS. 14, 15, 16, and 17. Triggering lever 51 is pivoted about pin 54 and has a driving cam contact surface 55. Surface 55 is contacted by a driving cam which is part of the removable water actuated release triggering unit. Lever 51 extends below floor 40 of frame 11 as the driving cam contact surface is urged forwardly to move triggering lever in a counter clockwise position shown in FIG. 15. Triggering lever 51 has a cover cam portion 56 which contacts a cover cam contact surface 57 on lever 58 connected to cover cam 53. As the triggering lever 51 is further moved counter clockwise to a position shown in FIG. 16, the lever trigger cam 59 contacts the lever cam arm contact surface 60, moving lever cam 52 in a clockwise direction essentially as shown in FIG. 12 of the drawings. As the triggering lever 51 is moved to its forward most position, the lever cam 52 is permitted to move back to its counter clockwise position as the parachute strap holder has already been released.

Thus, it can be seen that the mechanism shown in FIGS. 14, 15, 16, and 17 are actuated no matter how the triggering lever 51 is moved forward. Thus, various mechanisms can be affixed to the bottom of parachute canopy release mechanism 10 and will cause the automatic release of the parachute strap holder.

Directional terms such as clockwise or up or down are, of course, used to describe the devices as viewed in the drawings. It is to be understood that the mechanism operates in any orientation and that these terms are used to simplify the descriptions herein.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

We claim:

1. A parachute canopy release mechanism having a frame supporting a latch which latch interlocks with a strap holding member which is released by movement of the latch and the latch being moved by the movement of an actuating lever and the actuating lever being protectively covered by a movable cover and exposed when the movable cover is opened and said frame having a floor and side walls wherein the improvement comprises:

a canopy release locking bar held by one of said frame and said movable cover, said canopy release locking bar locks the cover with respect to the frame when it is in its closed position and permits the cover to move to an open position when the canopy release locking bar is in an open position which allows the cover to move and expose the actuating lever.

2. The canopy release locking mechanism of claim 1 wherein said canopy release locking bar is held by said cover.

3. The canopy release locking mechanism of claim 2 wherein said canopy release locking bar is pivotally held by said cover and has a frame engaging cam at each end and said frame supports a cam contacting arm at each end of said canopy release locking bar.

4. A parachute canopy release mechanism having a frame supporting a latch, said latch having a latch tooth which releasably holds a tang tooth of a parachute-strap-holding tang portion of a parachute strap holder which may be inserted or released in a direction parallel to a longitudinal axis of said frame, said latch being releasably secured in a locked position by an actuating lever, said actuating lever being covered by a hinged cover pivotable about an axis parallel to a transverse axis of said frame and said parachute canopy release mechanism being released by opening said hinged cover to expose said actuating lever and by opening said actuating lever the latch is released and moves into a position which releases its hold on said tang tooth and releases said parachute strap holder wherein the improvement comprises:

a canopy release locking bar held at an outer end of said hinged cover, said canopy release locking bar having a frame engaging member which locks the frame engaging member with respect to said frame when said canopy release locking bar is in its locked position and when in its locked position prevents the hinged cover from opening and said canopy release locking bar being movable to an unlocked position wherein said frame engaging member releases its lock to said frame and permits said hinged cover to open which permits said actuating lever to be opened.

5. The parachute canopy release mechanism of claim,4 wherein said canopy release locking bar is pivotally held at said outer end of said hinged cover.

6. The parachute canopy release mechanism of claim 5 wherein said frame engaging member of said canopy release locking bar abuts a pin portion of said frame extending inwardly from an inner surface portion of said frame.

7. The parachute canopy release mechanism of claim 6 wherein said frame has a pair of vertical side plates extending upwardly from a floor portion and each vertical side plate having an inwardly directed side and canopy release locking bar is positioned within said inwardly directed sides and each of said vertical side plates supporting the pin portion of said frame.

8. The parachute canopy release mechanism of claim 4 wherein said canopy release locking bar has a knurled face having a plurality of longitudinal ridges, a plurality of said ridges having a plurality of notches formed along said plurality of ridges.

* * * * *